United States Patent [19]

Rouillard et al.

[11] Patent Number: 6,046,514

[45] Date of Patent: Apr. 4, 2000

[54] BYPASS APPARATUS AND METHOD FOR SERIES CONNECTED ENERGY STORAGE DEVICES

[75] Inventors: Jean Rouillard, Saint-Luc; Christophe Comte, Montreal; Dominik Daigle, St-Hyacinthe, all of Canada

[73] Assignees: 3M Innovative Properties Company, St. Paul, Minn.; Hydro-Quebec Corporation, Montreal, Canada

[21] Appl. No.: 08/900,325

[22] Filed: Jul. 25, 1997

[51] Int. Cl.[7] .................................................. H02J 1/14
[52] U.S. Cl. ............................ 307/77; 200/210; 320/122; 361/88
[58] Field of Search .................................. 320/121, 122; 361/92, 88; 200/209, 210; 307/77, 10.1, 63

[56] References Cited

U.S. PATENT DOCUMENTS

| | | |
|---|---|---|
| 2,812,376 | 11/1957 | Yardney . |
| 3,193,412 | 7/1965 | Salkind et al. . |
| 3,275,770 | 9/1966 | Kilmer et al. ............................ 200/82 |
| 3,390,014 | 6/1968 | Eisler . |
| 3,578,506 | 5/1971 | Chassoux . |
| 3,786,466 | 1/1974 | Naito et al. . |
| 3,899,355 | 8/1975 | Chiklis . |
| 3,904,999 | 9/1975 | Rich et al. . |
| 4,061,955 | 12/1977 | Thomas et al. ............................ 320/6 |
| 4,091,186 | 5/1978 | Ott et al. . |
| 4,238,721 | 12/1980 | DeLuca et al. . |
| 4,241,152 | 12/1980 | Klink . |
| 4,322,484 | 3/1982 | Sugalski . |
| 4,339,638 | 7/1982 | Lascelles et al. .......................... 200/52 |
| 4,342,978 | 8/1982 | Meister . |
| 4,370,531 | 1/1983 | Tobin . |
| 4,383,013 | 5/1983 | Bindin et al. . |
| 4,409,538 | 10/1983 | Tabata . |
| 4,479,083 | 10/1984 | Sullivan . |
| 4,490,707 | 12/1984 | O'Leary . |
| 4,495,259 | 1/1985 | Uba . |
| 4,517,265 | 5/1985 | Belanger et al. . |

(List continued on next page.)

FOREIGN PATENT DOCUMENTS

| | | |
|---|---|---|
| 044 753 A1 | 1/1982 | European Pat. Off. . |
| 145 498 A2 | 6/1985 | European Pat. Off. . |
| 177 225 A1 | 4/1986 | European Pat. Off. . |
| 244 683 A1 | 11/1987 | European Pat. Off. . |
| 310 075 A2 | 4/1989 | European Pat. Off. . |
| 336 102 A2 | 10/1989 | European Pat. Off. . |
| 569 035 A1 | 11/1993 | European Pat. Off. . |
| 570 590 A1 | 11/1993 | European Pat. Off. . |
| 584 639 A1 | 3/1994 | European Pat. Off. . |
| 643 429 A2 | 3/1995 | European Pat. Off. . |
| 652 620 A1 | 5/1995 | European Pat. Off. . |
| 700 109 A1 | 3/1996 | European Pat. Off. . |
| 0 721 247 A2 | 7/1996 | European Pat. Off. . |
| 774 795 A2 | 5/1997 | European Pat. Off. . |
| 780 920 A1 | 6/1997 | European Pat. Off. . |

(List continued on next page.)

*Primary Examiner*—Albert W. Paladini
*Attorney, Agent, or Firm*—Mueting, Raasch & Gerbhardt, P.A.

[57] ABSTRACT

A bypass apparatus and method for series connected energy storage devices. Each of the energy storage devices coupled to a common series connection has an associated bypass unit connected thereto in parallel. A current bypass unit includes a sensor which is coupled in parallel with an associated energy storage device or cell and senses an energy parameter indicative of an energy state of the cell, such as cell voltage. A bypass switch is coupled in parallel with the energy storage cell and operable between a non-activated state and an activated state. The bypass switch, when in the non-activated state, is substantially non-conductive with respect to current passing through the energy storage cell and, when in the activated state, provides a bypass current path for passing current to the series connection so as to bypass the associated cell. A controller controls activation of the bypass switch in response to the voltage of the cell deviating from a pre-established voltage setpoint. The controller may be included within the bypass unit or be disposed on a control platform external to the bypass unit. The bypass switch may, when activated, establish a permanent or a temporary bypass current path.

70 Claims, 12 Drawing Sheets

U.S. PATENT DOCUMENTS

| | | |
|---|---|---|
| 4,518,665 | 5/1985 | Fujita et al. . |
| 4,571,468 | 2/1986 | Weldon . |
| 4,670,703 | 6/1987 | Williams . |
| 4,691,085 | 9/1987 | Swanson . |
| 4,692,577 | 9/1987 | Swanson . |
| 4,707,795 | 11/1987 | Alber et al. . |
| 4,758,483 | 7/1988 | Armand et al. . |
| 4,824,746 | 4/1989 | Belanger et al. . |
| 4,828,939 | 5/1989 | Turley et al. . |
| 4,851,307 | 7/1989 | Armand et al. . |
| 4,852,684 | 8/1989 | Packard . |
| 4,897,917 | 2/1990 | Gauthier et al. . |
| 4,913,259 | 4/1990 | Packard . |
| 4,961,043 | 10/1990 | Koenck . |
| 4,967,136 | 10/1990 | Nofzinger . |
| 4,973,936 | 11/1990 | Dimpault-Darcy et al. . |
| 5,057,385 | 10/1991 | Hope et al. . |
| 5,070,787 | 12/1991 | Weldon et al. . |
| 5,071,652 | 12/1991 | Jones et al. . |
| 5,162,171 | 11/1992 | Jones . |
| 5,180,641 | 1/1993 | Burns et al. . |
| 5,197,889 | 3/1993 | Rizzo et al. . |
| 5,199,239 | 4/1993 | Younger . |
| 5,204,194 | 4/1993 | Miller et al. . |
| 5,227,259 | 7/1993 | Weaver et al. . |
| 5,227,264 | 7/1993 | Duval et al. . |
| 5,300,373 | 4/1994 | Shackle . |
| 5,313,152 | 5/1994 | Wozniak et al. . |
| 5,324,597 | 6/1994 | Leadbetter et al. . |
| 5,337,042 | 8/1994 | Hormel et al. . |
| 5,346,786 | 9/1994 | Hodgetts . |
| 5,354,630 | 10/1994 | Earl et al. . |
| 5,363,405 | 11/1994 | Hormel . |
| 5,382,480 | 1/1995 | Molyneux . |
| 5,384,212 | 1/1995 | Heiman et al. . |
| 5,385,793 | 1/1995 | Tiedemann et al. . |
| 5,393,617 | 2/1995 | Klein . |
| 5,401,595 | 3/1995 | Kagawa et al. . |
| 5,409,787 | 4/1995 | Blanyer et al. . |
| 5,415,954 | 5/1995 | Gauthier et al. . |
| 5,422,200 | 6/1995 | Hope et al. . |
| 5,423,110 | 6/1995 | Gauthier et al. . |
| 5,438,249 | 8/1995 | Chang et al. . |
| 5,478,667 | 12/1995 | Shackle et al. . |
| 5,478,668 | 12/1995 | Gozdz et al. . |
| 5,479,083 | 12/1995 | Brainard . |
| 5,487,958 | 1/1996 | Tura . |
| 5,503,947 | 4/1996 | Kelly et al. . |
| 5,503,948 | 4/1996 | MacKay et al. . |
| 5,504,415 | 4/1996 | Podrazhansky et al. . |
| 5,519,563 | 5/1996 | Higashijimaa et al. . |
| 5,521,024 | 5/1996 | Sasaki et al. . |
| 5,528,122 | 6/1996 | Sullivan et al. . |
| 5,530,336 | 6/1996 | Eguchi et al. . |
| 5,532,087 | 7/1996 | Nerz et al. . |
| 5,547,775 | 8/1996 | Eguchi et al. . |
| 5,547,780 | 8/1996 | Kagawa et al. . |
| 5,548,200 | 8/1996 | Nor et al. . |
| 5,556,576 | 9/1996 | Kim . |
| 5,561,380 | 10/1996 | Sway-Tin et al. . |
| 5,563,002 | 10/1996 | Harshe . |
| 5,567,539 | 10/1996 | Takahashi et al. . |
| 5,568,039 | 10/1996 | Fernandez . |
| 5,569,063 | 10/1996 | Morioka et al. . |
| 5,569,550 | 10/1996 | Garrett et al. . |
| 5,573,869 | 11/1996 | Hwang et al. . |
| 5,582,931 | 12/1996 | Soichiro . |
| 5,585,207 | 12/1996 | Wakabe et al. . |
| 5,589,290 | 12/1996 | Klink et al. . |
| 5,593,604 | 1/1997 | Beasly et al. . |
| 5,594,320 | 1/1997 | Pacholok et al. . |
| 5,595,835 | 1/1997 | Miyamoto et al. . |
| 5,595,839 | 1/1997 | Hossain . |
| 5,599,636 | 2/1997 | Braun . |
| 5,600,230 | 2/1997 | Dunstan . |
| 5,602,481 | 2/1997 | Fukuyama . |
| 5,610,495 | 3/1997 | Yee et al. . |
| 5,612,153 | 3/1997 | Moulton et al. . |
| 5,619,417 | 4/1997 | Kendall . |
| 5,622,789 | 4/1997 | Young . |
| 5,623,196 | 4/1997 | Fernandez et al. . |
| 5,626,990 | 5/1997 | Miller et al. . |
| 5,631,537 | 5/1997 | Armstrong . |
| 5,633,573 | 5/1997 | van Phuoc et al. . |
| 5,637,981 | 6/1997 | Nagai et al. . |
| 5,643,044 | 7/1997 | Lund . |
| 5,647,534 | 7/1997 | Kelz et al. . |
| 5,648,713 | 7/1997 | Mangez . |
| 5,650,240 | 7/1997 | Rogers . |
| 5,652,498 | 7/1997 | Edye et al. . |
| 5,652,502 | 7/1997 | van Phuoc et al. . |
| 5,654,622 | 8/1997 | Toya et al. . |
| 5,824,432 | 10/1998 | Currle . |

FOREIGN PATENT DOCUMENTS

| | | |
|---|---|---|
| 2 511 547 | 2/1983 | France . |
| 2 721 407 | 12/1995 | France . |
| 3246968 A1 | 7/1984 | Germany . |
| 4218381 C1 | 5/1993 | Germany . |
| 42 25 746 A1 | 2/1994 | Germany . |
| 94 15 874 U | 12/1994 | Germany . |
| 19618897 A1 | 11/1997 | Germany . |
| 59-091658 | 5/1984 | Japan . |
| 59-117061 | 7/1984 | Japan . |
| 59-139555 | 8/1984 | Japan . |
| 61-099278 | 5/1986 | Japan . |
| 63-062156 | 3/1988 | Japan . |
| 01320758 | 12/1989 | Japan . |
| 04294071 | 10/1992 | Japan . |
| 05166533 | 7/1993 | Japan . |
| 07250788 | 10/1995 | Japan . |
| 07282841 | 10/1995 | Japan . |
| 08115711 | 5/1996 | Japan . |
| 9-017416 | 1/1997 | Japan . |
| 1582979 | 1/1981 | United Kingdom . |
| 2216720 | 10/1989 | United Kingdom . |
| 2 282 924 | 4/1995 | United Kingdom . |
| 2295718 | 6/1996 | United Kingdom . |
| WO 91/17451 | 11/1991 | WIPO . |
| WO 92/02963 | 2/1992 | WIPO . |
| WO 94/14206 | 6/1994 | WIPO . |
| WO 95/00978 | 1/1995 | WIPO . |
| WO 95/34824 | 12/1995 | WIPO . |
| WO 96/17397 | 6/1996 | WIPO . |
| WO 96/22523 | 7/1996 | WIPO . |
| WO 98/11620 | 3/1998 | WIPO . |

…

BYPASS APPARATUS AND METHOD FOR SERIES CONNECTED ENERGY STORAGE DEVICES

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to energy storage devices, and more particularly, to an apparatus and method for providing a bypass current path for a defective energy storage device connected in series with other energy storage devices.

BACKGROUND OF THE INVENTION

A number of advanced energy storage device technologies have recently been developed, such as metal hydride (e.g., Ni-MH), lithium-ion, and lithium polymer cell technologies, which promise to provide high energy generation for a wide range of commercial and consumer applications. In high-energy applications, a substantial number of individual energy storage devices or cells are typically connected in series to produce a requisite amount of electrical power. By way of example, it is believed that a battery system suitable for powering an electric vehicle will likely have a voltage rating on the order of several hundred volts, and a current rating on the order of several hundred amperes.

In applications in which rechargeable energy storage cells are connected together in series, it is considered desirable to use cells which are equivalent or very similar in terms of electrochemistry and voltage/current characteristics. It is known that undesirable consequences often result during charging and discharging when an energy storage cell within a series string of cells exhibits characteristics that vary significantly from those of other serially connected energy storage cells.

For example, the energy output of a series string of electrochemical cells is limited by the performance of individual cells within the series connection. A defective or anomalously operating cell reduces the overall performance of the series connected cells, yet attempts to operate at a level equivalent to that of higher performing cells in the series string. This undesirable imbalance in cell operating characteristics results in accelerated degradation of the poor performing cell which, in turn, increases the rate at which overall energy system performance degrades.

Another adverse consequence of cell asymmetry within a series connection involves the voltage of an anomalous energy storage cell within the series string, which will rapidly exceed a nominal maximum voltage limit during charging. Such an overvoltage or overcharge condition may damage the cell and significantly reduce the service life of the cell and other cells within the series connection.

A number of techniques have been developed to moderate the adverse consequences arising from the continued presence of a defective cell within a series string of cells. Such techniques, however, are typically inapplicable in high-current, high-voltage power generating systems. Other known implementations exhibit unacceptably high resistance to current flow through the series connection, thus reducing the power delivered by the series string of cells and increasing heat generation within the cell string. Such implementations typically exhibit undesirable leakage current characteristics as well.

It can be appreciated that the characteristics of mass manufactured energy storage cells will deviate to varying degrees from a given set of build requirements. Further, cell characteristics, even if considered acceptable at the time of manufacture, will deviate from manufactured specifications at varying rates and to varying degrees over time.

There is a need in the battery manufacturing industry for an apparatus and method for effectively and safely moderating the adverse impact of a defective cell on the overall performance of series connected energy storage cells. There exists a further need for such an implementation which is also capable of handling a large current flow through the series connection. The present invention fulfills these and other needs.

SUMMARY OF THE INVENTION

The present invention is directed to a bypass apparatus and method for series connected energy storage devices. Each of the energy storage devices coupled to a common series connection has an associated bypass unit connected thereto in parallel. A current bypass unit includes a sensor which is coupled in parallel with an associated energy storage device or cell and senses an energy parameter indicative of an energy state of the cell, such as cell voltage. A bypass switch is coupled in parallel with the energy storage cell and operable between a non-activated state and an activated state. The bypass switch, when in the non-activated state, is substantially non-conductive with respect to current passing through the energy storage cell and, when in the activated state, provides a bypass current path for passing current to the series connection so as to bypass the associated cell. A controller controls activation of the bypass switch in response to the voltage of the cell deviating from a pre-established voltage setpoint. The controller may be included within the bypass unit or be disposed on a control platform external to the bypass unit. The bypass switch may, when activated, establish a permanent or a temporary bypass current path.

DETAILED DESCRIPTION OF THE EMBODIMENTS

Figure 1:
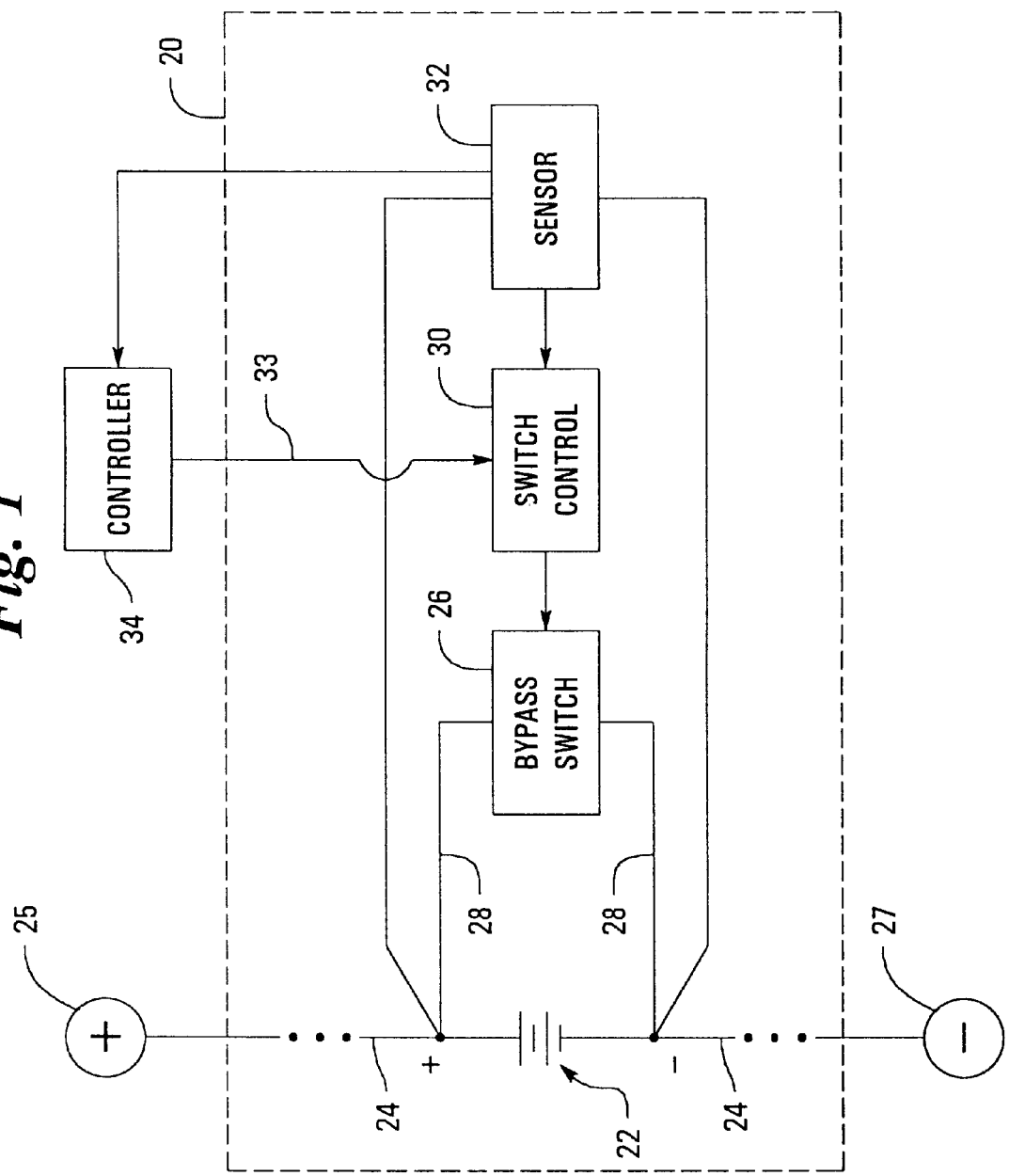
FIG. 1 is a depiction of an embodiment of a current bypass apparatus for use with seriesconnected energy storage devices.

Referring now to the drawings, and more particularly to FIG. 1, there is illustrated an embodiment of a bypass apparatus for use with series-connected energy storage devices. A number of energy storage devices 22 are connected in series by a series connection or bus 24 that terminates at a positive terminal 25 and a negative terminal 27. A bypass apparatus 20 is associated with a corresponding energy storage device 22 and is typically connected in parallel with the corresponding energy storage device 22.

In a typical mode of operation, the energy storage devices 22 connected to the series connection 24 produce a discharge current which is delivered to a load or other energy-consuming element. Under nominal conditions, each of the bypass units 20 remains in a non-interactive state so as not to disrupt the flow of current through the serially connected energy storage devices 22. During a typical charging mode of operation, the bypass units 20 are similarly non-interactive with respect to the flow of charge current through the series connection under nominal conditions.

In the event that an energy storage device 22 within the series connection 24 becomes defective or operates in an anomalous manner while charging or discharging, the bypass unit 20 associated with the defective energy storage device 22 is activated. Upon activation, the bypass unit 20 diverts current passing through the series connection 24 through a bypass current path so as to shunt current around the defective energy storage device 22. In one embodiment, the bypass unit 20 establishes a permanent current shunt in parallel with the defective energy storage unit 22 which effectively isolates the defective device 22 from the series connection 24. In an alternative embodiment, a temporary current shunt is established around the defective device 22 which may subsequently be made permanent after confirming that the device 22 is, indeed, defective.

Once such anomalous operating condition concerns a low voltage condition in which the voltage across a particular cell falls below a low voltage threshold. The bypass device is typically activated in response to the cell voltage falling below the low voltage threshold. Another anomalous condition involves a reverse polarity condition which is detected across a defective cell, such as a dead cell. The bypass unit may be activated upon detecting a change in polarity across the cell.

Still referring to the embodiment illustrated in FIG. 1, the bypass unit 20 includes a bypass switch 26 which is connected in parallel with an energy storage cell 22. Also connected in parallel with the cell 22 is a sensor 32 which senses an energy parameter indicative of the energy state of the cell 22. In one embodiment, the sensor 32 monitors the potential across the cell 22. The sensor 32 is coupled to a switch control 30 which, in turn, is coupled to the bypass switch 26. In one embodiment, the switch control 30 compares a sense voltage received from the sensor 32 with a pre-established reference voltage. The switch control 30 computes a difference signal representative of the difference between the sensed voltage and the reference voltage. In response to the difference signal exceeding a pre-established setpoint, the switch control 30 generates a control signal which is transmitted to the bypass switch 26. The bypass switch 26, in response to the control signal, activates and shunts current through a bypass current path 28 coupled to the series connection 24 so that the current bypasses the cell 22.

The switch control 30, in accordance with one embodiment, communicates with a controller 34 external to the bypass unit 20 and receives setpoint parameters and a triggering signal from the controller 34. For example, the reference voltage used by the switch control 30 when computing the difference signal may be established by the controller 34 and communicated to the switch control 30 over a communication channel 33. By way of further example, the controller 34, upon determining that a particular energy cell 22 within the common series connection 24 is defective or operating in an anomalous manner, produces a triggering signal which is communicated to the switch control 30. In response to the triggering signal, the switch control 30 produces a command signal which actuates the bypass switch 26 to divert current in the series connection 24 around the defective cell 22.

In this embodiment, the controller 34, which may be a microprocessor, advantageously provides for the acquisition of operational and status information concerning the bypass units 20 and the energy storage cells 22 coupled to the series connection 24. Such an embodiment further provides for the communication of information, including status information and control parameters, between the controller 34 and a system controller or computer which may be provided on a module platform or a battery system platform.

Figure 2:
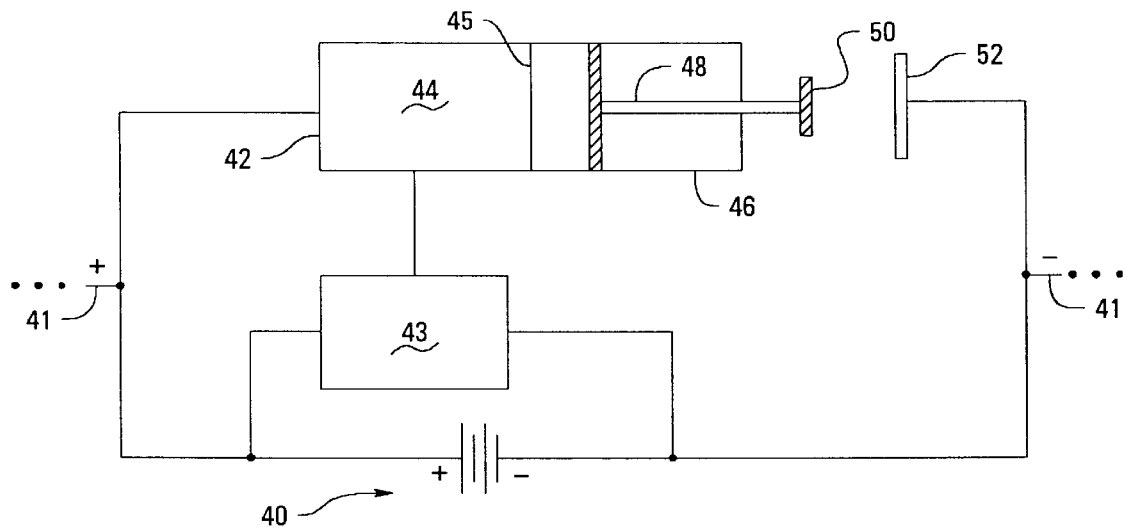
FIGS. 2–3 illustrate an embodiment of a current bypass device for a series-connected energy storage unit in a non-activated and activated state, respectively.
Figure 3:
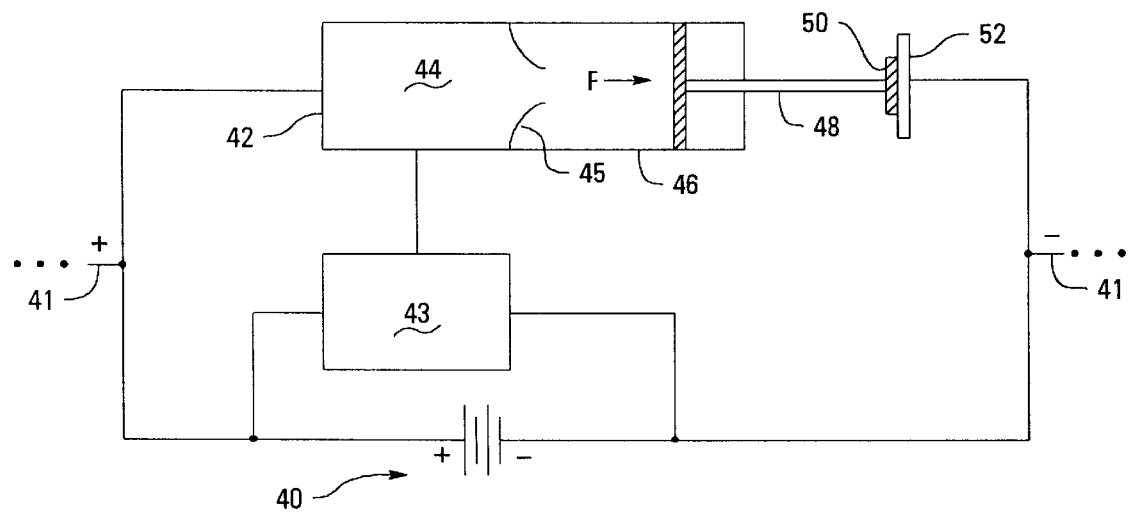

In FIGS. 2–3, there is illustrated an embodiment of a bypass unit depicted in a non-activated state and an activated state, respectively. In accordance with this embodiment, a bypass controller 43 detects a potential across one of a number of series-connected energy storage cells 40. The bypass controller 43 is coupled to a mechanical bypass actuator 46 which includes a movable terminal 48 and a chamber 44. In response to detecting an anomalous operating condition of the cell 40, the bypass controller 43 activates the bypass actuator 46 such that the movable terminal 48 moves from a non-contacting state, such as that shown in FIG. 2, to a contacting state, such as that shown in FIG. 3.

More particularly, the chamber 44 contains a material or gas which, when activated by the bypass controller 43, rapidly expands and ruptures a separation wall 45 disposed between the chamber 44 and the movable terminal 48. Activation of the gas or material contained within the chamber 44 forces the movable terminal 48 into engagement with a stop terminal 52. As such, a contact 50 of the movable terminal 48 matingly engages the stop contact 52. A current path is thus established through the bypass actuator 46, which is significantly less resistive to electrical current than the current path through the anomalously operating cell 40. As a result of activating the bypass actuator 46, a permanent short-circuit current path is established through the bypass activator 46 which provides for the uninterrupted flow of current to other cells 40 within the series connection 41.

Figure 4:
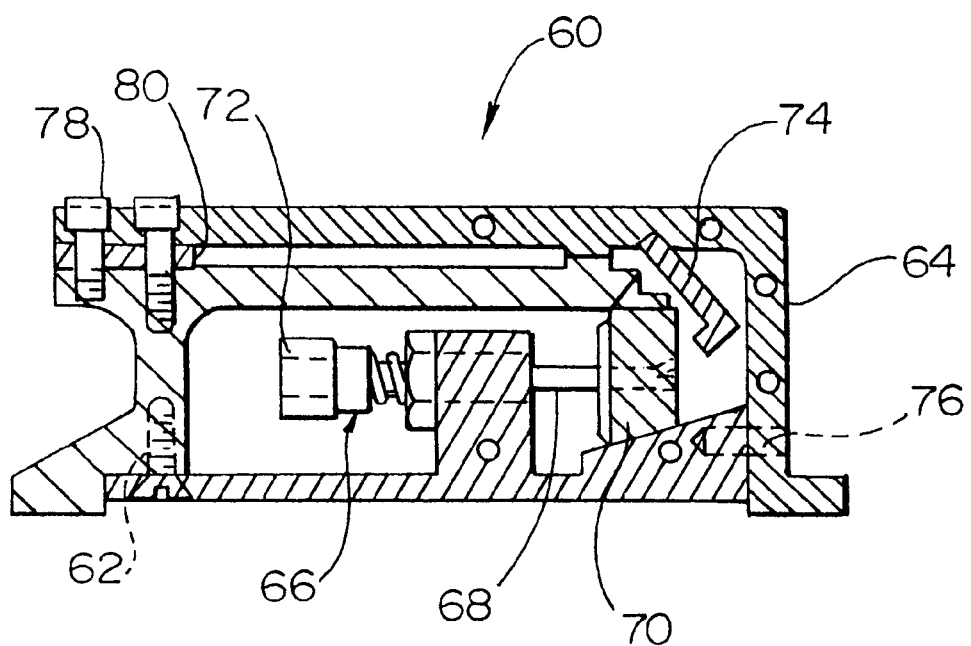
FIG. 4 is a cross-sectional view of a mechanical current bypass device in an activated state in accordance with an embodiment of the present invention.

In FIG. 4, there is illustrated an embodiment of a bypass actuator 60 which operates in a manner similar to that described generally with respect to FIGS. 2–3. The bypass actuator 60 includes a container 66 filled with "air bag powder" which is activated by use of a small fuse 72. The term "air bag powder" refers generally to an explosive powder commonly used for activation of automobile airbags. The activation process is initiated by blowing the fuse 72 which causes rapid expansion of the air bag powder within the powder container 66. The force produced by activation of the air bag powder causes a piston 68 and metal rod 70 to rapidly accelerate toward a contact terminal 64. The conductive metal rod 70, upon contacting the terminal 64, establishes a permanent bypass current path through which current passes from a terminal 62, through the conductive metal rod 70, and through the contact terminal 64, thereby bypassing a cell connected in parallel with the pair of terminals 62, 64.

In establishing a permanent, stable, and low-resistance interface between the metal rod 70 and contact terminal 64, it is important that undesirable bounce-back of the metal rod 70 occurring after initial impact with the terminal 64 be prevented. Bounce-back of the metal rod 70 will create an arc between the rod 70 and the contact terminal 64 which typically alters the surface characteristics or interface geometry of both the rod 70 and the contact terminal 64. Such undesirable alterations result in a significant increase in the electrical resistance at the contact interface and instability of the contact interface in the presence of mechanical shocks. It is desirable, therefore, to prevent bounce-back from occurring between the metal rod 70 and contact terminal 64 upon activation of the bypass actuator 60.

In one embodiment, a number of grooves are provided along a surface of an inclined surface 76 of the contact terminal 64. The inclined groove surface 76, such as that shown in FIGS. 6A–6B, guides the metal rod 70 in a straight path towards the contact terminal 76/64. A small spring may be employed to exert an upwardly directed force on the metal rod 70 which facilitates movement of the rod 70 along the inclined grooved surface 76 of the contact terminal 64. This configuration provides for reliable and permanent contact between the metal rod 70 and contact terminal 64, and prevents undesirable bounce-back from occurring at the contact interface.

In the embodiment illustrated in FIG. 4, the air bag powder container 66 is cylindrical in configuration and has a diameter of approximately 0.25 inches. It is noted that the terminals 62, 64 may be made of copper. During a non-activated state, the metal rod 70 may be isolated from the contact terminal 64 by use of an isolator 74 which exerts a resistive force on the metal rod 70, thereby limiting movement of the rod 70 prior to activation. The isolator 74, which may be fashioned from electrically non-conductive material, is moved to a non-interfering orientation by the force exerted on it by the metal rod 70 upon activation of the air bag powder.

Figure 5:
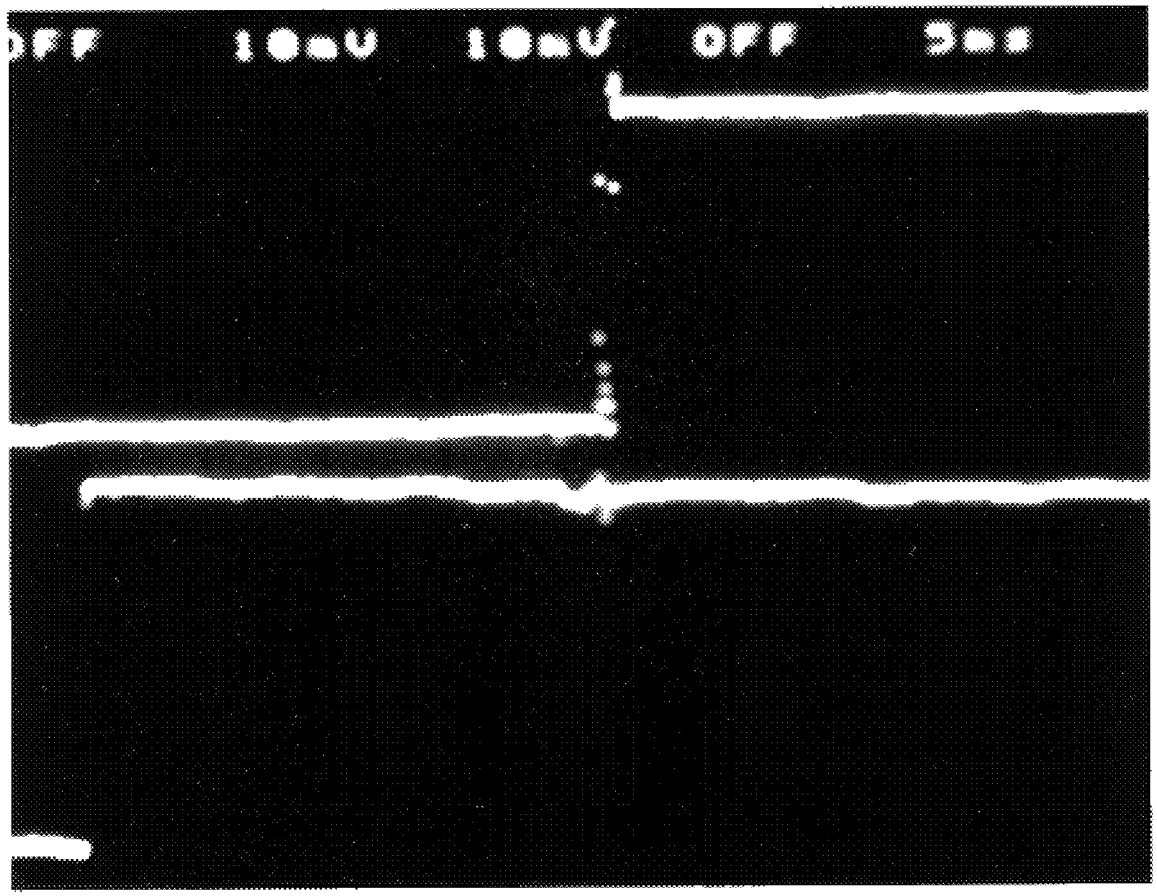
FIG. 5 is a photomicrographic depiction of a waveform which illustrates the switching time associated with activation of the bypass device shown in FIG. 4.

The diagram provided in FIG. 5 demonstrates that, upon activation of the bypass actuator 60, a stabilized current passes through the bypass current path established between the terminals 62, 64 with no occurrence of bounce-back. Contact between the metal rod 70 and contact terminal 64 is made within a period of approximately 5 milli-seconds after activation of the air bag powder. The contact resistance at the interface between the metal rod 70 and contact terminal 64 is on the order of approximately 25 milli-ohm.

Figure 6:
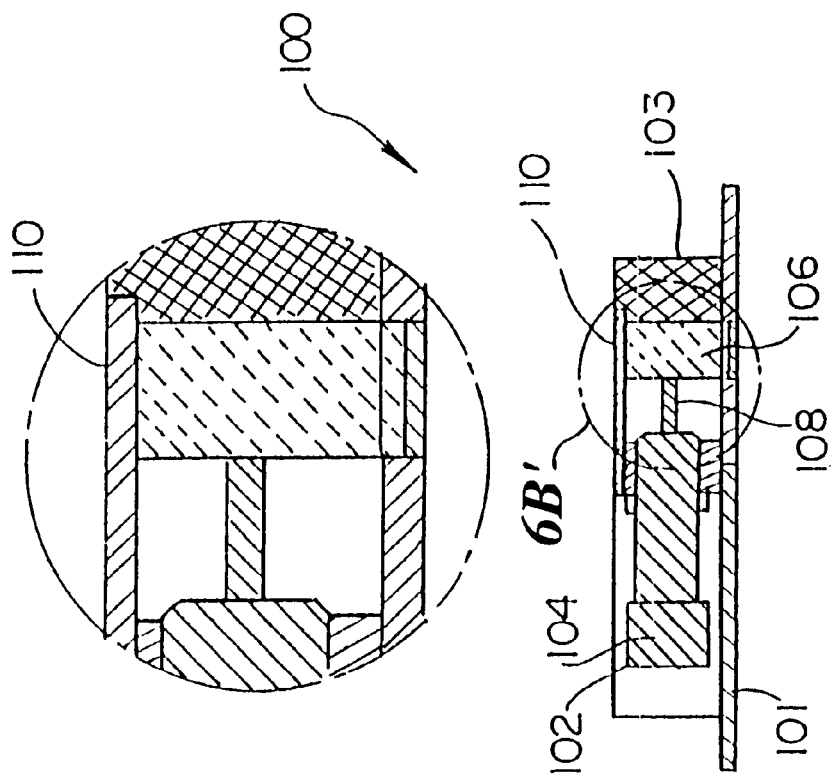
FIGS. 6A–6B are top cross-sectional views of a current bypass device in a non-activated states and an activated state, respectively, in accordance with another embodiment of the present invention.

In the embodiment shown in FIGS. 6A–6B, a bypass device 100 includes an actuator 104 which is mounted to a first terminal 101 of the bypass device 100. The first terminal 101 and a second terminal 103 of the bypass device 100 are connected to respective first and second terminals of a series connected energy storage device. When a fuse 102 is blown, a piston 108 attached to the actuator 104 pushes the conductive rod 106 in a direction along a guide constituted by the first terminal 101 and an insulator 110 in a direction towards the second terminal 103. When the conductive rod 106 contacts the second terminal 103, the conductive rod 106 is prevented from bouncing back out of engagement with the second terminal 103 by barb-like protrusions or grooves 112 developed on a surface of the guide portion of the second terminal 103. As such, secure and permanent contact is established between the first and second terminals 101, 103 through which current passing through the series connection is diverted.

Figure 7:
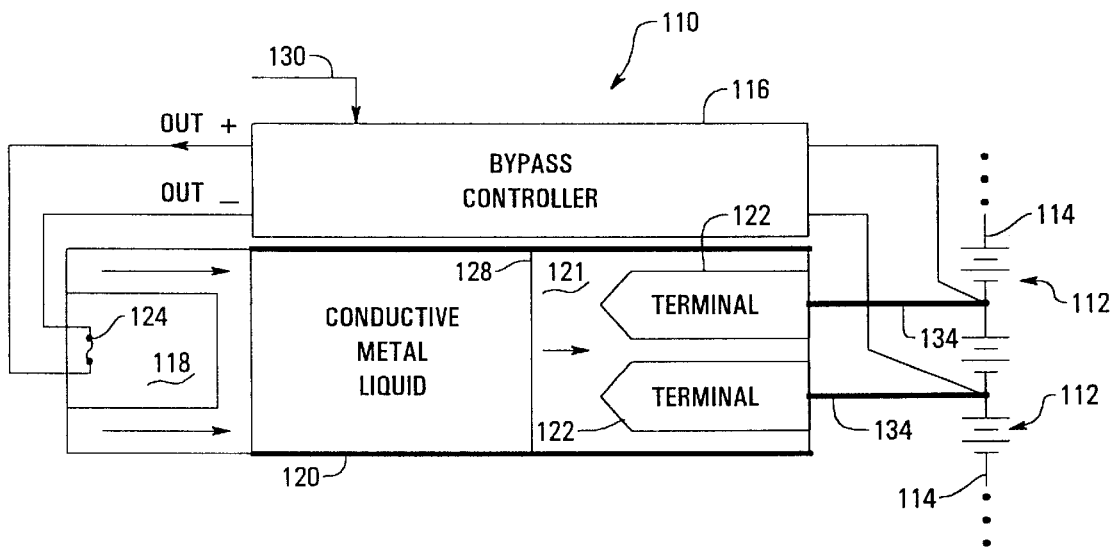
FIG. 7 shows yet another embodiment of a current bypass device.

Referring now to FIG. 7, there is illustrated another embodiment of a bypass unit 110 which, upon activation, provides for a permanent bypass circuit path for purposes of bypassing current in a series connection 114 and isolating a defective energy storage device or cell 112 from the series connection. In this particular embodiment, a conductive liquid metal is contained in a chamber 120 disposed between a chamber 118 containing an explosive material, such as air bag powder, and a chamber 121 within which a pair of terminals 122 are provided. The terminals 122 are connected to positive and negative contacts of the cell 112, respectively. Upon detection of a defective energy storage cell 112, or upon receiving a triggering signal 130 from an external controller or processor, the bypass controller 116 blows the fuse 124, causing the air bag powder in the chamber 118 to activate. The force of activation causes a separation wall 128 to rupture which, in turn, permits the conductive liquid metal 120 to flow into contact with the terminals 122, 123. The conductive liquid metal provides a low-resistivity path 134 through which current passing through the series connection 114 is conducted so as to bypass the defective cell 112.

In general, the bypass units depicted herein are activated upon the occurrence of an open circuit detected across a cell or a determination that the cell is defective during either a charging or discharging mode of operation. A bypass unit may self-activate upon detecting an open circuit condition occurring in the cell 112, or may be externally activated, such as by receiving a triggering signal from an external controller or processor, when the controller determines that the cell 112 is defective or operating in an anomalous manner.

Figure 8:
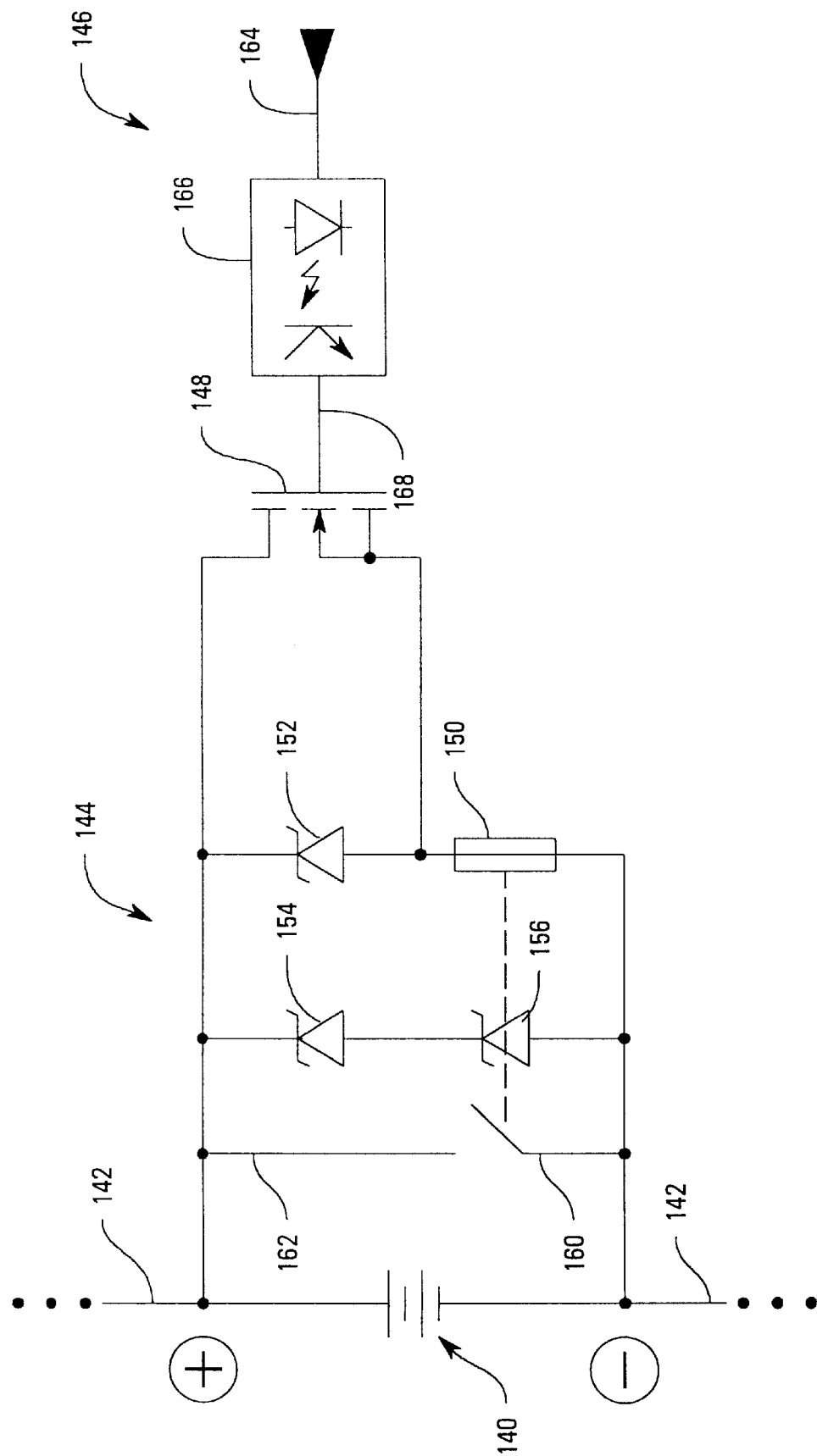
FIG. 8 illustrates in schematic form an embodiment of a current bypass circuit.

Turning now to FIG. 8, there is illustrated an embodiment of a bypass circuit for detecting an anomalous operating condition in a cell and for establishing a current path to a series connection other than through a defective cell. The bypass circuit shown in FIG. 8 includes an internal detection circuit 144 which detects an open circuit condition in the cell 140 and, in response, activates a bypass switch 160 so as to establish a low-resistivity current path 162 around the defective cell 140. The bypass circuit may also include an interface circuit 146 which provides connectivity with an external processor or controller which, upon issuance of a triggering signal, externally activates the bypass switch 160. It is noted that the bypass switch 160 is representative of a mechanical bypass apparatus, such as those previously described, or other permanent or non-permanent mechanical or electrical bypass device.

The bypass device shown in FIG. 8 may be activated under at least three conditions. The bypass device may be activated externally, through use of the interface circuit 146 as discussed previously. Secondly, the bypass device is activated upon detection of an open circuit condition in the cell 140 during cell discharge. Thirdly, an open circuit condition occurring in the cell 140 while charging will result in activation of the bypass device.

Concerning the first mode of activating the bypass circuit shown in FIG. 8, the voltage across the cell 140 is monitored and if determined to be below a pre-set voltage limit, $V_p$, such as 1.0 V, a triggering signal 164 produced by a controller or processor coupled to the interface circuit 146 is received by an opto-isolation driver 166. The opto-isolation driver 166, upon receiving the triggering signal 164, causes a transistor 148, such as a MOSFET transistor, to conduct current, which causes the fuse 150 to blow. Blowing the fuse 150 results in activation of the bypass switch 160 which establishes a bypass current path 162 that isolates the defective cell 140 from the series connection 142.

With regard to the second mode of activating the bypass device, if an open circuit condition occurs in the cell 140 during cell discharge, a negative voltage is detected across the defective cell 140. A diode 152, as a result of the negative voltage across the cell 140, begins conducting current which causes the fuse 150 to blow. It is noted that the voltage across the cell 140 will be limited to the pre-set voltage limit, $V_f$. Blowing the fuse 150 causes the bypass switch 160 to close, thus establishing the bypass current path 162. A time delay between blowing of the fuse 150 and closing of the bypass switch 160 results in forward-biasing of the diodes 154 and 156, thereby limiting the voltage across the cell at twice the pre-set voltage limit, $V_f$, during this time period.

Concerning the third mode of bypass device activation, a positive voltage will be detected across a defective cell 140 upon occurrence of an open circuit condition in the cell 140 during charging. As a result, the diode 152 begins conducting current causing the fuse 150 to blow. In this condition, the voltage across the cell 140 will be limited to approximately 4.7 V. The bypass switch 160 is activated so as to establish the bypass current path 162 upon blowing of the fuse 150. The time delay between the fuse blowing and closing of the bypass switch 160 results in reverse-biasing of the diodes 154 and 156, thus limiting the voltage across the defective cell to 10 V (2 diodes×5 V).

Figure 9:
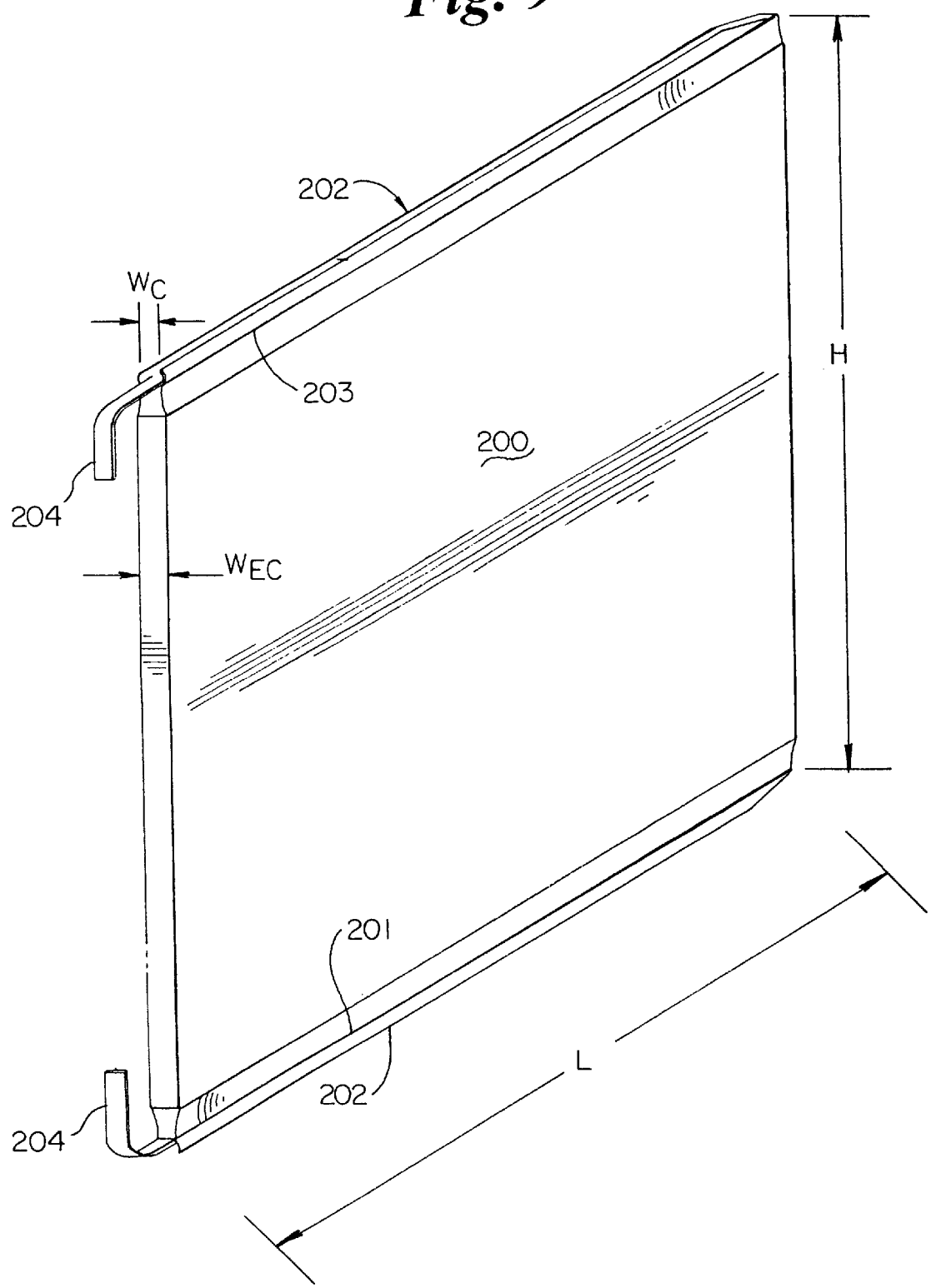
FIG. 9 is an illustration of a prismatic electrochemical cell which represents one embodiment of an energy storage device.
Figure 10:
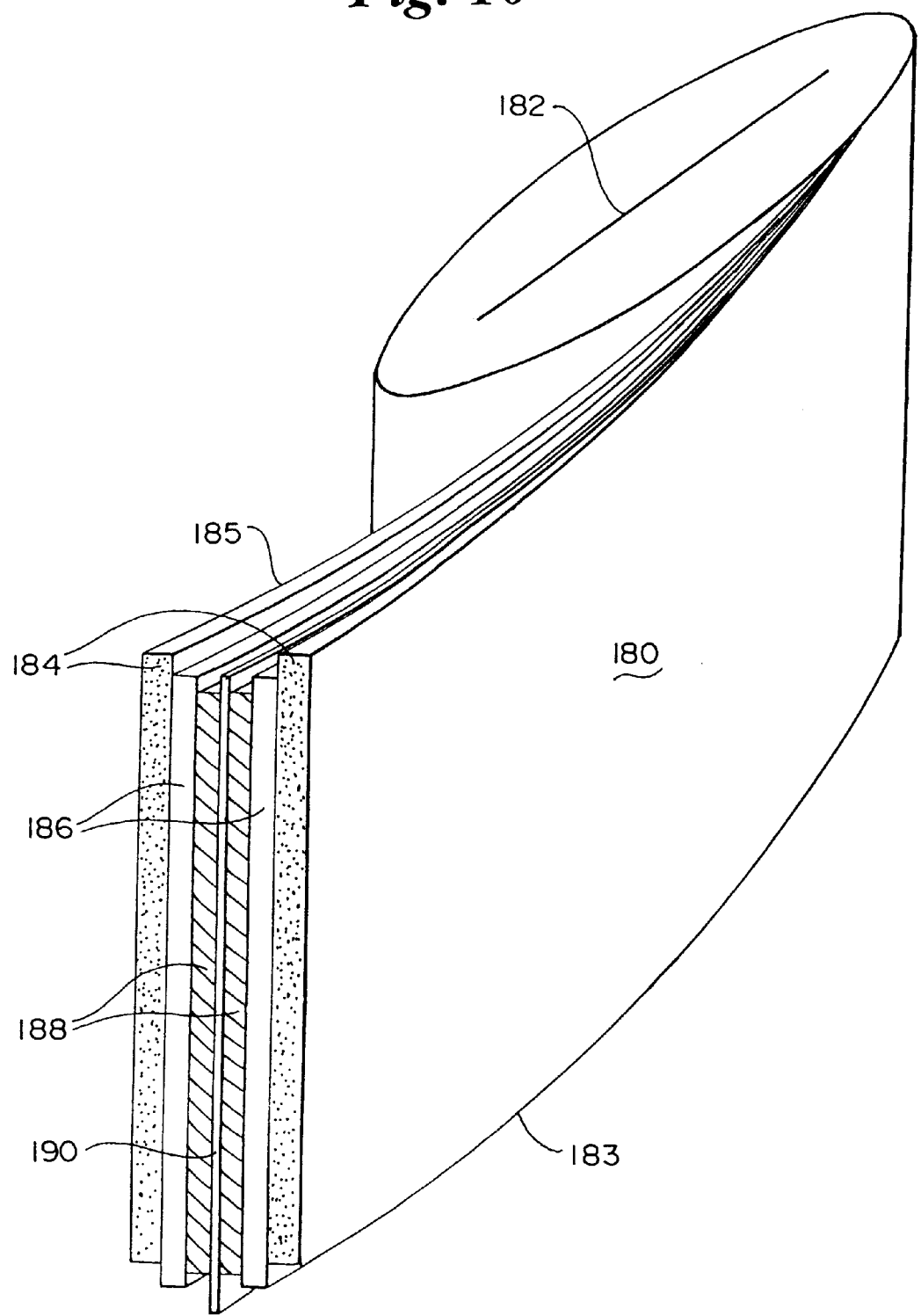
FIG. 10 is a depiction of various film layers constituting an electrochemical cell in accordance with an embodiment of the present invention.

In accordance with one embodiment of the present invention, the energy storage devices shown in FIGS. 2–3 and 7–8 constitute solid-state, thin-film cells of the type shown in FIGS. 9–10. Such thin-film electrochemical cells are particularly well-suited for use in the construction of high-current, high-voltage energy storage modules and batteries, such as those used to power electric vehicles for example.

In FIG. 9, there is shown an embodiment of a prismatic electrochemical cell 200 which includes an anode contact 201 and a cathode current collector contact 203 formed respectively along opposing edges of the electrochemical cell 200. A thermal conductor 202 is spot welded or otherwise attached to each of the anode and cathode contacts 201, 203, respectively. A thermal conductor 202 is typically disposed along the length of the anode contact 201 and the cathode current collector contact 203, and typically includes an electrical connection lead 204 for conducting current, which is collected and conducted along the anode and cathode contacts 201, 203, into and out of the electrochemical cell 200.

The thermal conductor 202, in one embodiment, also provides a thermal flux path for efficiently transferring thermal energy between the cell 200 and a thermally conductive, electrically resistive material or structure disposed adjacent the cell 200. In this regard, the anode and cathode contact arrangement may be viewed as a two-part structure constituted by a current conducting metallization layer (i.e., contacts 201, 203) and a separate thermal conductor 202. It is understood that a combined electrical/ thermal conductor constituted by a single structure attached to the anode and cathode current conducting film layers may also be employed. The thermal conductor 202 is configured so as to exhibit a spring-like character which provides for substantially continuous contact between the cell 200 and a structure, such as a metallic planar surface of a containment vessel, disposed adjacent the cell 200 in response to relative movement between the cell 200 and the adjacent structure. The thermal conductor 202 may be fashioned from copper and have a substantially C-shaped, double C-shaped, Z-shaped, V-shaped, O-shaped, or S-shaped cross-section.

Figure 11:
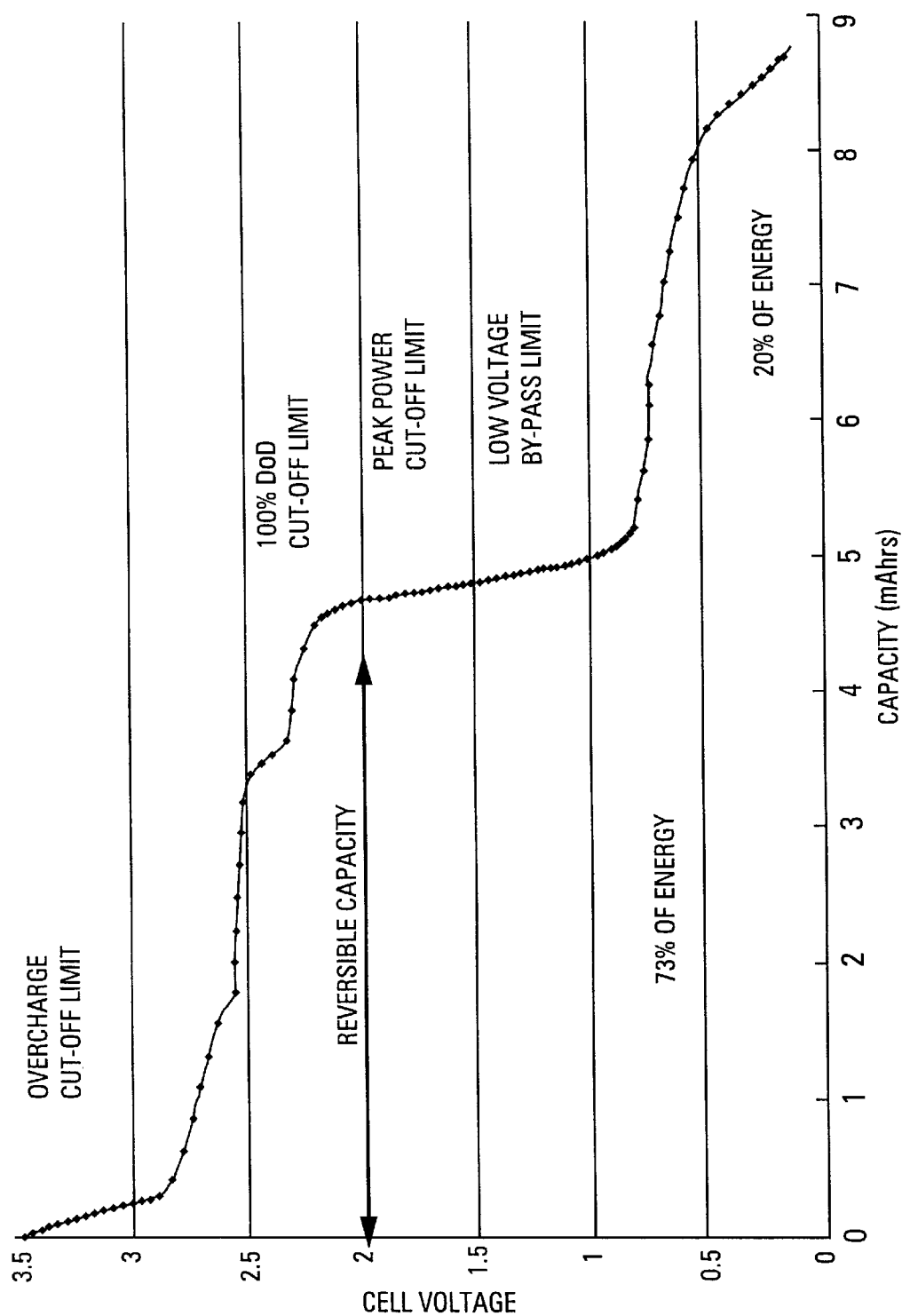
FIG. 11 illustrates in graphical form a relationship between voltage and capacity of a solid-state, thin-film cell having a construction similar to that shown in FIGS. 9–10.

In this embodiment, the electrochemical cell 200 is fabricated to have a length L of approximately 135 mm, a height H of approximately 149 mm, and a width $W_{ec}$ of approximately 5.4 mm or approximately 5.86 mm when including a foam core element. The width $W_c$ of the cathode contact 203 and the anode contact 201 is approximately 3.9 mm, respectively. Such a cell 200 typically exhibits a nominal energy rating of approximately 36.5 Wh, a peak power rating of 87.0 W at 80 percent depth of discharge (DOD), and a cell capacity of 14.4 Ah at full charge. FIG. 11 illustrates in graphical form a relationship between voltage and capacity for an electrochemical cell having a construction substantially similar to that illustrated in FIGS. 9–10. It can be seen that an individual electrochemical cell has a nominal operating voltage ranging between approximately 2.0 V and 3.1 V.

The electrochemical cell shown in FIG. 9 may have a construction similar to that illustrated in FIG. 10. In this embodiment, an electrochemical cell 180 is shown as having a flat wound prismatic configuration which incorporates a solid polymer electrolyte 186 constituting an ion transporting membrane, a lithium metal anode 184, a vanadium oxide cathode 188, and a central current collector 190. These film elements are fabricated to form a thin-film laminated prismatic structure, which may also include an insulation film, such as polypropylene film.

A known sputtering metallization process is employed to form current collecting contacts along the edges 185, 183 of the anode and cathode current collector films 184, 190, respectively. It is noted that the metal-sprayed contacts provide for superior current collection along the length of the anode and cathode current collector film edges 185, 183, and demonstrate good electrical contact and heat transfer characteristics. The electrochemical cells illustrated in FIGS. 9–10 may be fabricated in accordance with the methodologies disclosed in U.S. Pat. Nos. 5,423,110, 5,415, 954, and U.S. Pat. No. 4,897,917.

A number of electrochemical cells may be selectively interconnected in a parallel and/or series relationship to achieve a desired voltage and current rating. For example, and with reference to FIGS. 12–13, a number of individual electrochemical cells 210 may be grouped together and connected in parallel to common positive and negative power buses or lines to form a cell pack 212. A number of the electrochemical cell packs 212 may then be connected in series to form a module 214. Further, a number of individual modules 214 may be connected in series to constitute a battery 216.

Figure 12:
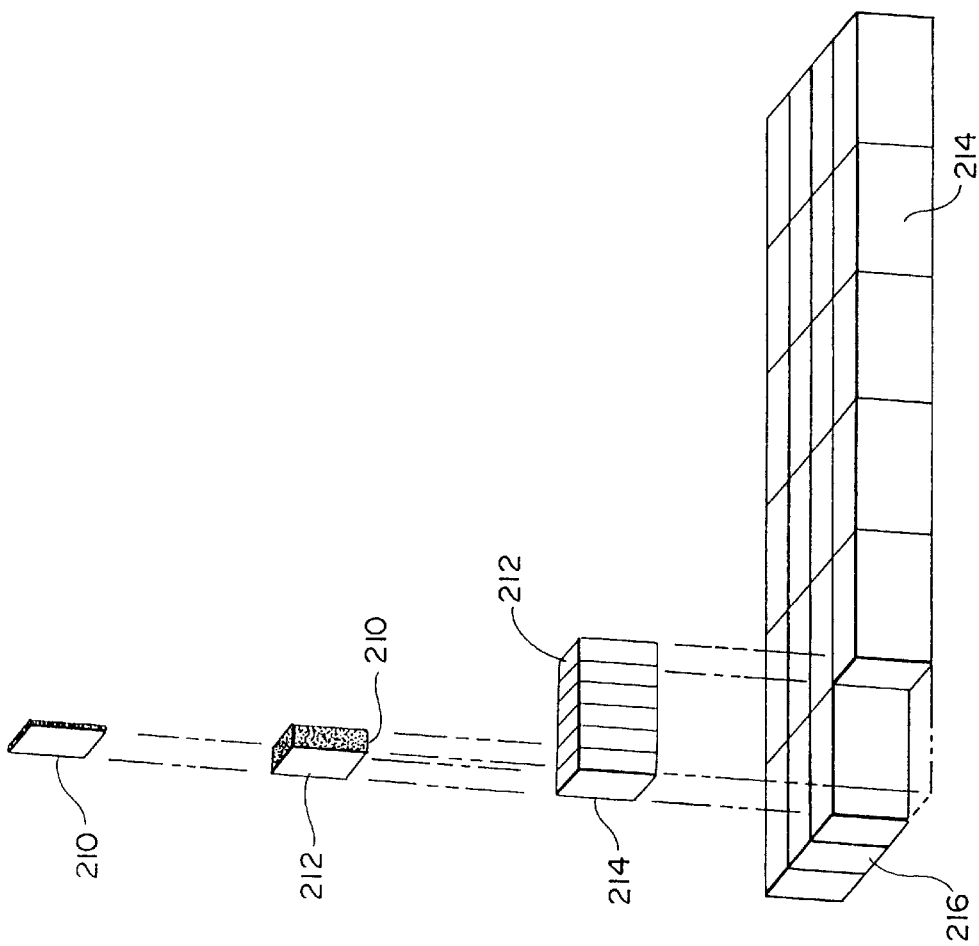
FIG. 12 illustrates various packaging configurations of an energy storage device, including cell pack, module, and battery configurations.
Figure 13:
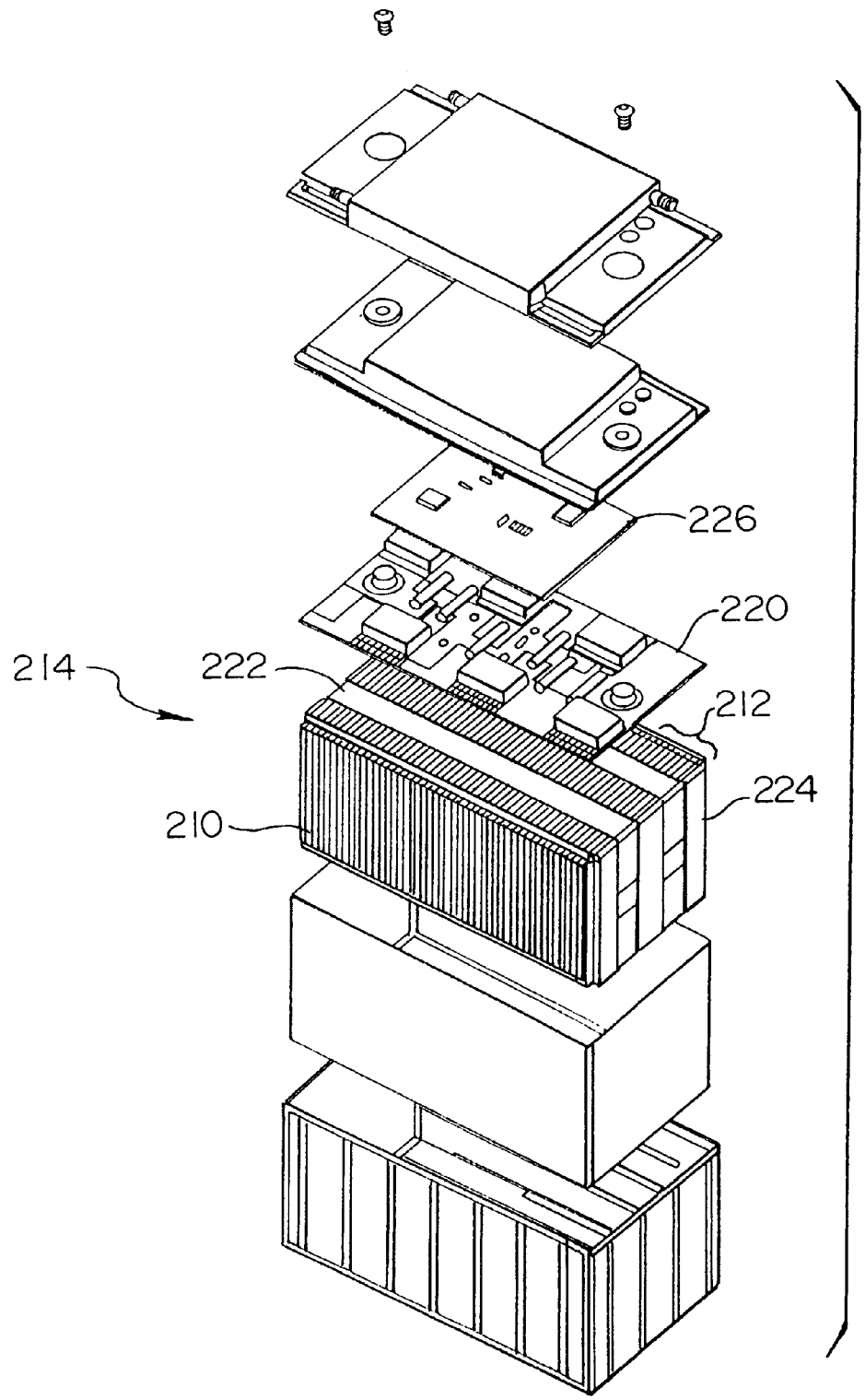
FIG. 13 is an exploded view of an energy storage module in accordance with an embodiment of the present invention.

The embodiments shown in FIGS. 12–13 depict an arrangement of electrochemical cells 210 in accordance with a modular packaging approach which provides an efficient means of achieving desired power requirements for a broad range of high-power applications. In this illustrative embodiment, eight electrochemical cells 210 are grouped together and connected in parallel to form a cell pack 212. A module 214 is constituted by grouping six cell packs 212 together and connecting the packs 212 in series. A battery 216 is shown as constituting 24 modules 214 connected in series.

Given these arrangements, and assuming that each of the electrochemical cells 210 has dimensions and characteristics equivalent to those depicted in FIG. 11, each individual cell 210 provides for a total energy output of approximately 36.5 Wh. Each cell pack 212 provides for a total energy output of approximately 292 Wh, while each module 214 provides for a total energy output of 1.75 kWh. The battery 216, constituted by an array of four axially and six longitudinally oriented modules 214 connected in series as is shown in the embodiment of FIG. 12, provides for a total energy output of approximately 42 kWh. It is understood that the arrangement of electrochemical cells 210 and interconnection of cells 210 forming a cell pack 212, module 214, and battery 216 may vary from the arrangements depicted in FIGS. 12–13.

A significant advantage realized when employing a bypass apparatus that operates in accordance with the principles of the present invention concerns the ability to pass a significant amount of current, such as on the order of several hundred amps, through the bypass current path established upon activation of the bypass apparatus. For example, an individual bypass unit of the type described generally hereinabove may be connected in parallel with each electrochemical cell pack 212 contained within each module 214 constituting a battery 216. In the configuration shown in FIG. 12, the series connected modules 214 of the battery 216 generate a peak operating current of approximately 400 A. Upon activation of a particular bypass unit associated with a defective cell pack 212, the bypass current path established by the bypass unit conducts the full amperage of the series connection (i.e., 400 A peak).

In FIG. 13, there is shown an exploded view of an embodiment of an energy storage module 214 which houses a number of electrochemical cells 210, interconnection hardware, and control hardware and software. In accordance with one embodiment, the module 214 includes a stack of 48 electrochemical cells 210 which are interconnected through use of a power board 220. The stack of electrochemical cells 210 are segregated into six cell packs 212, all of which are banded together by use of two bands 222 and two opposing thrust plates 224.

The 48 electrochemical cells 210 are subjected to continuous compressive forces generated by use of the bands 222/thrust plates 224 and a foam or spring-type element disposed in each of the cells 210 and/or between all or selected ones of the cells 210. It is noted that the foam or spring-type core element provided in the center of each of the cells 210 serves to distribute pressure evenly between the cells 210, which is of particular importance as cell volumes change during charge and discharge cycling. Bypass circuitry is typically provided on the power board 220, but may also include components, such as a microprocessor, disposed on a control board 226 or other internal or external platform that electrically communicates with the power board 220.

It will, of course, be understood that various modifications and additions can be made to the various embodiments discussed hereinabove without departing from the scope or spirit of the present invention. By way of example, the bypass methodology disclosed herein may be employed for series connected energy storage devices of a conventional design, such as wet and dry electrolytic cells, or an advanced design, such as those employing nickel metal hydride (Ni-MH), lithium-ion, (Li-Ion), and other high energy battery technologies. Accordingly, the scope of the present invention should not be limited by the particular embodiments discussed above, but should be defined only by the claims set forth below and equivalents thereof.

What we claim is:

1. A bypass apparatus for an energy storing device coupled to a series connection, comprising:

a chamber containing an activatable medium;

a movable terminal disposed adjacent the chamber and moveable between a contacting and a non-contacting state with respect to a stationary terminal, the movable terminal and stationary terminal being coupled in parallel across the energy storing device;

an activation circuit, coupled to the chamber and the energy storing device, that activates the activatable medium in response to an anomalous condition occurring in the energy storing device, the activated medium producing a force that moves the movable terminal into contact with the stationary terminal thereby providing a bypass current path to the series connection that bypasses the energy storing device; and a voltage limiting circuit coupled in parallel across the energy storing device, the voltage limiting circuit limiting a voltage across the energy storing device during provision of the bypass current path.

2. The apparatus of claim 1, wherein the bypass apparatus further comprises an ignition source disposed within the chamber and coupled to the activation circuit for activating the activatable medium.

3. The apparatus of claim 1, wherein the bypass apparatus further comprises a guide over which the movable terminal moves, the guide including a grooved surface that inhibits movement of the movable terminal after the movable terminal moves into contact with the stationary terminal.

4. The apparatus of claim 1, wherein the activatable medium comprises air bag powder.

5. The apparatus of claim 1, wherein the activatable medium comprises a gaseous medium.

6. The apparatus of claim 1, wherein the bypass apparatus further comprises a movable insulator disposed between the movable terminal and the stationary terminal to prevent contact between the movable terminal and the stationary terminal prior to activation of the activatable medium.

7. The apparatus of claim 1, wherein the activation circuit comprises a controller that detects the anomalous condition occurring in the energy storing device.

8. The apparatus of claim 7, wherein the controller is disposed external to the bypass apparatus.

9. The apparatus of claim 7, wherein the controller is provided within the activation circuit.

10. The apparatus of claim 1, wherein substantially all of a current passing through the series connection passes through the bypass current path defined by the movable terminal and the stationary terminal upon activation of the activatable medium.

11. The apparatus of claim 10, wherein the current passing through the movable terminal and the stationary terminal upon activation of the activatable medium has an amperage on the order of hundreds of amperes.

12. The apparatus of claim 1, wherein the activation circuit detects an open circuit condition as the anomalous condition occurring in the energy storing device, the activation circuit activating the activatable medium in response to the open circuit condition.

13. The apparatus of claim 1, wherein the activation circuit detects an open circuit in the energy storing device as a first voltage polarization during charging of the energy storing device, and detects an open circuit in the energy storing device as a second voltage polarization during discharging of the energy storing device.

14. The apparatus of claim 13, wherein the first voltage polarization is characterized by a positive voltage polarization, and the second voltage polarization is characterized by a negative voltage polarization.

15. The apparatus of claim 1, wherein the voltage limiting circuit limits the voltage across the energy storing device during a time between activation of the activatable medium and contact established between the movable terminal and the stationary terminal.

16. The apparatus of claim 1, wherein the voltage limiting circuit limits the voltage across the energy storing device to a predetermined voltage limit.

17. The apparatus of claim 1, wherein the voltage limiting circuit comprises one or more series connected diodes.

18. The apparatus of claim 17, wherein the voltage limiting circuit limits the voltage across the energy storing device to a voltage equivalent to a sum of forward-biasing voltage values associated with the one or more series connected diodes.

19. The apparatus of claim 1, wherein the activation circuit activates the activatable medium in response to the activation circuit detecting an anomalous condition occurring in the energy storing device or in response to receiving an activation signal from an external controller.

20. The apparatus of claim 1, wherein the energy storing device comprises an electrochemical cell selected from the group consisting of a metal hydride cell, a lithium ion cell, and a lithium polymer cell.

21. A bypass apparatus for an energy storing device coupled to a series connection, comprising:
  a first chamber containing an activatable medium;
  a second chamber disposed adjacent the first chamber and containing an electrically conductive fluid;
  a pair of terminals provided in a third chamber disposed adjacent the second chamber, the pair of terminals being coupled in parallel across the energy storing device;
  an activation circuit, coupled to the first chamber and the energy storing device, that activates the activatable medium in response to detecting an anomalous condition in the energy storing device, the activated medium causing the electrically conductive fluid to pass from the second chamber into the third chamber and between the pair of terminals so as to provide a bypass current path to the series connection that bypasses the energy storing device; and
  a voltage limiting circuit coupled in parallel across the energy storing device, the voltage limiting circuit limiting a voltage across the energy storing device during provision of the bypass current path.

22. The apparatus of claim 21, wherein:
  the bypass apparatus further comprises an ignition source disposed in the first chamber for activating the activatable medium; and
  the activatable medium comprises one of a gaseous medium or air bag powder.

23. The apparatus of claim 21, wherein the activation circuit comprises a detector that detects an anomalous voltage across the energy storing device.

24. The apparatus of claim 23, wherein the detector detects an open circuit voltage as the anomalous voltage across the energy storing device, the activation circuit activating the activatable medium in response to the detector detecting the open circuit voltage.

25. The apparatus of claim 21, wherein substantially all of a current passing through the series connection passes through the current path defined by the pair of terminals upon activation of the activatable medium.

26. The apparatus of claim 21, wherein the voltage limiting circuit limits the voltage across the energy storing device to a predetermined voltage limit.

27. The apparatus of claim 21, wherein the voltage limiting circuit comprises one or more series connected diodes.

28. The apparatus of claim 27, wherein the voltage limiting circuit limits the voltage across the energy storing device to a voltage equivalent to a sum of forward-biasing voltage values associated with the one or more series connected diodes.

29. A bypass apparatus for an energy storing unit coupled to a series connection, comprising:
  a sensor coupled in parallel with the energy storing unit that senses an energy parameter indicative of an energy state of the energy storing unit;
  a bypass device coupled in parallel with the energy storing unit and operable in a non-activated state and an activated state, the bypass device, when in the non-activated state, being substantially non-conductive with respect to current passing through the energy storing unit and, when in the activated state, providing a bypass current path for passing the current to the series connection other than through the energy storing unit;
  a controller coupled to the sensor and the bypass device, the controller causing the bypass device to actuate from the non-activated state to the activated state in response to the energy parameter deviating from a pre-established setpoint; and
  a voltage limiting circuit coupled in parallel across the energy storing unit, the voltage limiting circuit limiting a voltage across the energy storing unit during provision of the bypass current path.

30. The apparatus of claim 29, wherein the energy parameter sensed by the sensor is a voltage of the energy storing unit.

31. The apparatus of claim 29, wherein the bypass device comprises a displaceable conductor and a stationary conductor, the displaceable conductor moving into engagement with the stationary conductor to provide the bypass current path.

32. The apparatus of claim 31, wherein the displaceable conductor comprises an electrically conductive fluid.

33. The apparatus of claim 31, wherein the displaceable conductor comprises an electrically conductive rod.

34. The apparatus of claim 29, wherein the bypass device comprises a displaceable conductor and a stationary conductor, the displaceable conductor moving into engagement with the stationary conductor under an explosive force to provide the bypass current path.

35. The apparatus of claim 29, wherein the bypass device provides a permanent bypass current path for passing the current to the series connection.

36. The apparatus of claim 29, wherein the controller comprises a microprocessor disposed external to the bypass apparatus.

37. The apparatus of claim 29, wherein the energy storing unit comprises a plurality of parallel connected thin-film electrochemical cells coupled to the series connection.

38. The apparatus of claim 29 wherein the energy storing unit comprises a plurality of energy storing modules coupled to the series connection, each of the plurality of modules comprising a plurality of thin-film electrochemical cells connected in series.

39. The apparatus of claim 29, wherein substantially all of a current passing through the series connection passes through the bypass current path defined by the bypass device when the bypass device is in the activated state.

40. The apparatus of claim 39, wherein the current passing through the bypass current path defined by the bypass device has an amperage on the order of hundreds of amperes.

41. The apparatus of claim 29, wherein:
the controller comprises a microprocessor that senses the energy parameter as a voltage of the energy storing unit;
the microprocessor, in response to the sensed voltage deviating from a pre-set voltage limit, causing the bypass device to operate in the activated state.

42. The apparatus of claim 29, further comprising a voltage limiting circuit coupled in parallel across the energy storing unit, the voltage limiting circuit limiting a voltage across the energy storing unit during provision of the bypass current path.

43. The apparatus of claim 42, wherein the voltage limiting circuit limits the voltage across the energy storing unit during actuation of the bypass device.

44. The apparatus of claim 42, wherein the voltage limiting circuit limits the voltage across the energy storing unit to a predetermined voltage limit.

45. The apparatus of claim 42, wherein the voltage limiting circuit limits the voltage across the energy storing unit to a predetermined voltage limit.

46. The apparatus of claim 42, wherein the voltage limiting circuit comprises one or more series connected diodes.

47. The apparatus of claim 46, wherein the voltage limiting circuit limits the voltage across the energy storing device to a voltage equivalent to a sum of forward-biasing voltage values associated with the one or more series connected diodes.

48. The apparatus of claim 29, wherein the energy storing unit comprises an electrochemical cell selected from the group consisting of a metal hydride cell, a lithium ion cell, and a lithium polymer cell.

49. A bypass apparatus, comprising:
a plurality of energy storing units that produce a current passing through a series connection;
a plurality of bypass devices, each of the bypass devices being coupled to one of the plurality of energy storing units and comprising;
a bypass circuit coupled in parallel with a particular energy storing unit of the plurality of energy storing units that senses a voltage of the particular energy storing unit;
a bypass switch coupled in parallel with the particular energy storing unit that, when activated, provides a bypass current path for passing the current to the series connection so as to bypass the particular energy storing unit; and
a voltage limiting circuit coupled in parallel across the particular energy storing unit, the voltage limiting circuit limiting a voltage across the particular energy storing unit during provision of the bypass current path.

50. The apparatus of claim 14, wherein the bypass switch comprises a displaceable conductor and a stationary conductor, the displaceable conductor moving into engagement with the stationary conductor to provide the bypass current path.

51. The apparatus of claim 50, wherein the displaceable conductor comprises one of an electrically conductive fluid or an electrically conductive rod.

52. The apparatus of claim 49, wherein the bypass switch, when activated, passes substantially all of the current passing through the series connection.

53. The apparatus of claim 49, wherein the bypass circuit comprises a controller that senses the voltage of the particular energy storing unit and establishes a pre-set voltage limit, the controller activating the bypass switch in response to the sensed voltage deviating from the pre-set voltage limit.

54. The apparatus of claim 49, wherein the bypass circuit detects an open circuit in the particular energy storing unit, the bypass circuit activating the bypass switch in response to detecting the open circuit.

55. The apparatus of claim 49, wherein the bypass circuit detects a n open circuit in the particular energy storing unit as a first voltage polarization during charging of the energy storing units, and detects an open circuit in the particular energy storing unit as a second voltage polarization during discharging of the energy storing units.

56. The apparatus of claim 55, wherein the first voltage polarization is characterized by a positive voltage polarization, and the second voltage polarization is characterized by a negative voltage polarization.

57. The apparatus of claim 49, wherein the voltage limiting circuit limits the voltage across the particular energy storing unit during a time between activation of the activatable medium and contact established between the movable terminal and the stationary terminal.

58. The apparatus of claim 49, wherein the voltage limiting circuit limits the voltage across the particular energy storing unit to a predetermined voltage limit.

59. The apparatus of claim 49, wherein the voltage limiting circuit comprises one or more series connected diodes.

60. The apparatus of claim 59, wherein the voltage limiting circuit limits the voltage across the particular energy storing unit to a voltage equivalent to a sum of forward-biasing voltage values associated with the one or more series connected diodes.

61. The apparatus of claim 49, wherein the activation circuit activates the activatable medium in response to the activation circuit detecting an anomalous condition occurring in the particular energy storing unit or in response to receiving an activation signal from an external controller.

62. The apparatus of claim 49, wherein each of the energy storing units comprises an electrochemical cell selected from the group consisting of a metal hydride cell, a lithium ion cell, and a lithium polymer cell.

63. A method of bypassing an energy storing cell coupled to a series connection, comprising:
detecting an energy parameter of the energy storing cell;
passing current through the cell while the detected energy parameter indicates that the cell is operating nominally;
displacing an electrical conductor to establish parallel connectivity with the energy storing cell in response to the detected energy parameter indicating that the cell is operating anomalously;

limiting a voltage across the energy storing cell while establishing parallel connectivity with the energy storing cell; and conducting the current to the series connection through the displaced electrical conductor rather than through the cell.

64. The method of claim 63, wherein displacing the electrical conductor comprises igniting an activatable medium to produce a force that displaces the electrical conductor to establish parallel connectivity with the energy storing cell.

65. The method of claim 63, wherein:

the electrical conductor comprises electrically conductive fluid; and displacing the electrical conductor comprises displacing the electrically conductive fluid to establish parallel connectivity with the energy storing cell.

66. The method of claim 63, wherein detecting the energy parameter of the energy storing cell comprises detecting a voltage of the energy storing cell.

67. The method of claim 63, wherein limiting the voltage comprises limiting the voltage across the energy storing cell to a predetermined voltage limit.

68. The method of claim 63, wherein limiting the voltage comprises limiting the voltage using one or more series connected diodes.

69. The method of claim 68, wherein limiting the voltage comprises limiting the voltage across the energy storing cell to a voltage equivalent to a sum of forward-biasing voltage values associated with the one or more series connected diodes.

70. The method of claim 63, wherein the energy storing cell is selected from the group consisting of a metal hydride cell, a lithium ion cell, and a lithium polymer cell.

* * * * *